Patented Aug. 22, 1944

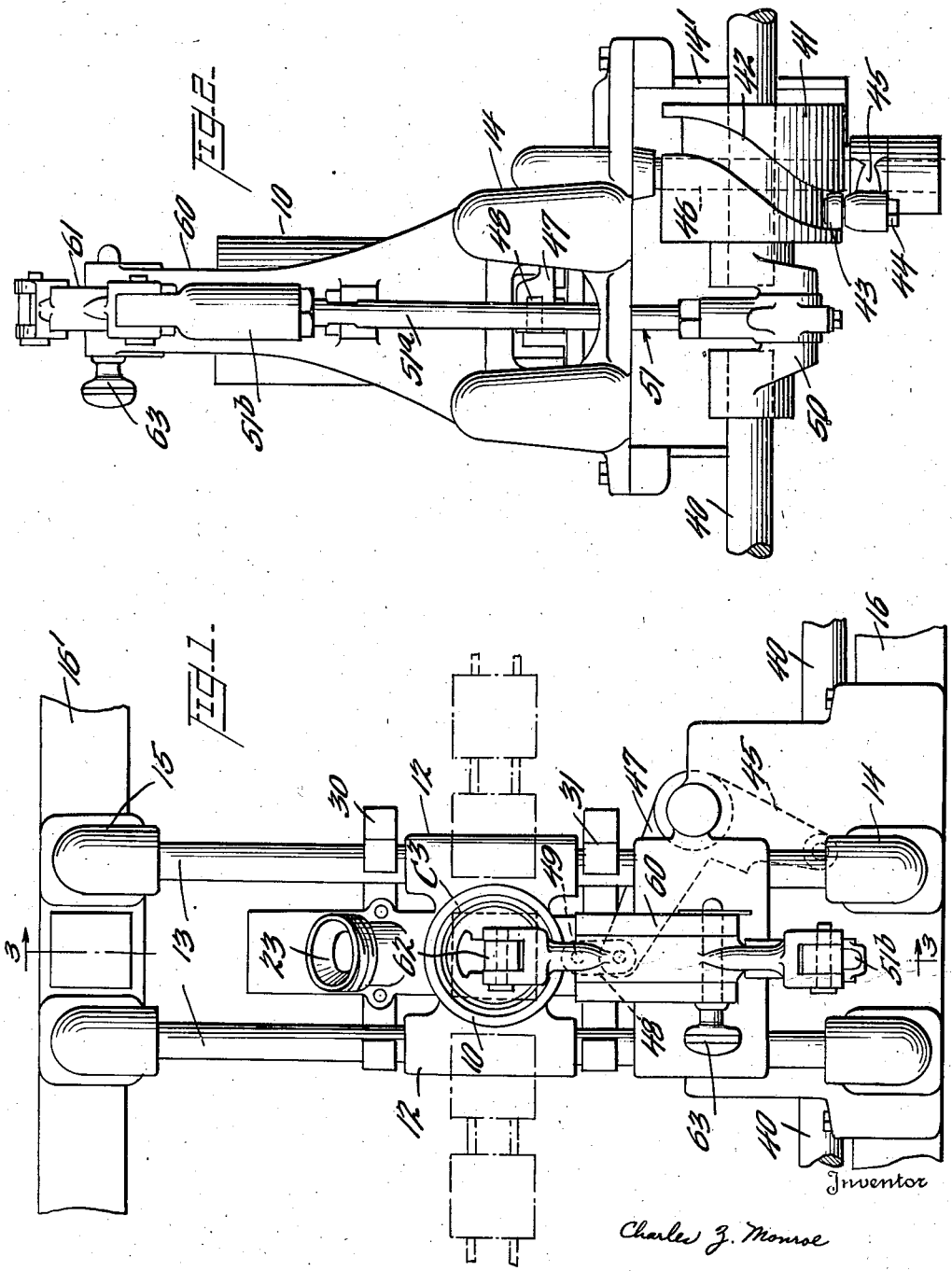

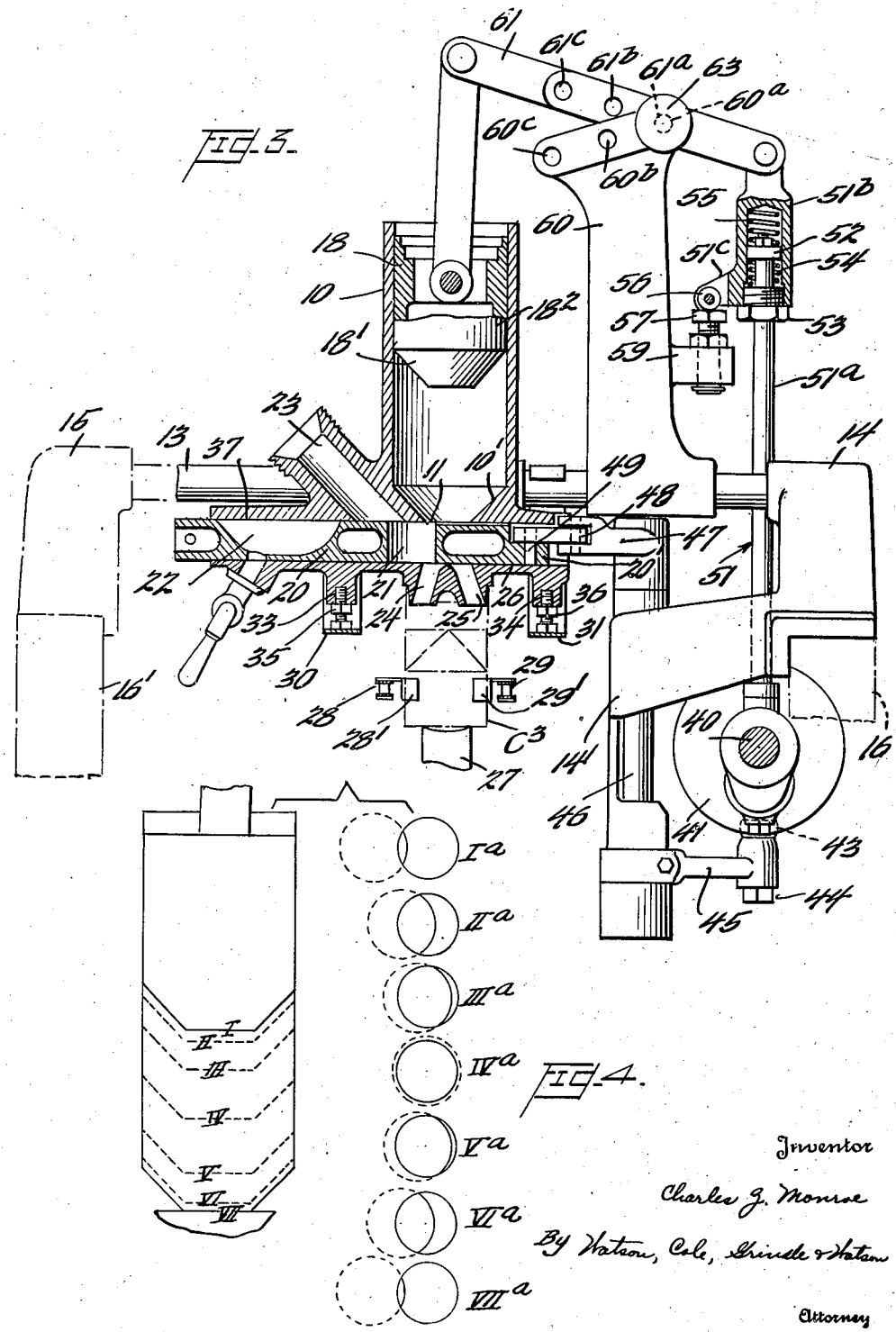

2,356,420

UNITED STATES PATENT OFFICE 2,356,420

LIQUID MEASURING AND DISPENSING APPARATUS

Charles Z. Monroe, Detroit, Mich., assignor to The American Paper Bottle Company, Toledo, Ohio, a corporation of Ohio Application August 3, 1942, Serial No. 453,414

5 Claims. (Cl. 222—387)

The present invention relates to apparatus for measuring and dispensing liquids, particularly liquids such as milk which tend to foam when agitated.

In Patent No. 2,202,073, issued to Julius E. Wollenweber, there is disclosed and claimed a liquid measuring and dispensing device primarily designed and intended for use as one element of a complete automatic liquid packaging apparatus by means of which paper containers in the form of collapsed blanks are successively squared-out, coated, charged with milk or the like, closed, and sealed, with great rapidity. One factor tending to limit the speed of operation of the machine results from the tendency of milk to foam when agitated in the operation of charging a container, it being necessary to delay sealing of the container after charging until the foam has settled or been dispersed. In order to minimize delay owing to this cause the container charging operation is accomplished in a succession of partial charging operations and, in addition, defoaming means is sometimes employed. I have discovered that the difficulty and delay which arises by reason of the foaming tendency of milk may be further minimized by controlling the rate of flow of milk into a container positioned to be charged, in a rather precise manner.

The Wollenweber measuring and dispensing device disclosed in the patent previously referred to includes a measuring cylinder having a port in its bottom, a slide valve having an aperture therein which may be brought into register with said port, or moved out of register, a piston having a close fitting engagement with the cylinder wall and movable toward and away from said port, and mechanism for operating the piston and slide valve in timed relation with each other.

The present invention proposes no change in the details of construction of the cylinder, piston and slide valve, but does contemplate certain changes in the means for actuating the piston and slide valve in timed relationship to each other, whereby the area of the effective opening in the cylinder wall available for the discharge of the outgoing stream of fluid, is caused to bear at all times some relationship to the rate of flow of fluid through said port. With the improved arrangement the size of the discharge port will be relatively small at the time when the piston is moving slowly on its liquid discharging stroke and the flow of fluid is not at a rapid rate, and will be a maximum at the time of the most rapid movement of the liquid discharging piston. The improved operating mechanism insures that the flow of liquid through the discharge port is at such velocity that the tendency of the liquid to foam during the discharging stroke of the piston is minimized, there being no possibility that liquid will be discharged at too high a velocity at any time or, alternatively, that the liquid will flow from the cylinder faster than the piston tends to expel it, an equally disadvantageous result. Preferably, the discharge port of the cylinder is formed in the cylinder bottom and the liquid is introduced into the cylinder through this port as well as expelled through the port into a waiting container. The means for and method of introducing liquid into the measuring chamber, however, may be varied, the invention not being limited in this respect. The invention contemplates other changes in the details of construction and arrangement of the valve and piston operating mechanism, as will be hereinafter explained.

One embodiment of the invention is illustrated by way of example in the accompanying drawings, in which Figure 1 is a top plan view of the mechanism showing certain of the underlying parts in dotted lines;

Figure 2 is a side elevation of the same;

Figure 3 is a section on line 3—3 of Figure 1; and

Figure 4 is a diagram in which may be observed the relationship between the travel of the piston in the measuring cylinder and the size of the effective opening of the discharge port of the cylinder, the effective port openings being indicated for various corresponding positions of the piston in its travel on its work or liquid discharging stroke.

The liquid measuring cylinder is indicated at 10, the axis of the cylinder being vertically disposed and the measuring chamber terminating at its lower end in a frusto-conical section 10' leading to a circular discharge port 11. Integral with the cylinder, and upon opposite sides thereof are horizontally disposed tubular members 12 which encircle parallel supporting bars 13, respectively, the ends of these bars being supported in side frame members 14 and 15. Frame members 14 and 15 may rest upon and be rigidly attached to pedestals or main side frame members 15 and 16 of a larger machine, for instance, an automatic container fabricating, charging, and sealing machine. The piston 18 is close fitting and its lower or liquid contacting face has a frusto-conical portion 18' and a circular central portion 18², the piston face, when the piston is in its lowermost position, fitting closely the wall of the frusto-conical lower end surface of the measuring cylinder so as to completely expel all liquid which may have been previously within the cylinder.

A slide valve is generally indicated at 20 and, generally speaking, it is the same in construction as the slide valve disclosed in the Wollenweber patent previously referred to, comprising an elongated member of rectangular cross section, provided with a cylindrical port 21 which may be brought into register with the circular cylinder discharge port 11, and an elongated recess 22 accessible from its upper face only, one end of which recess may be brought into register with cylinder discharge port 11 while its other end is in open communication with duct 23 leading downwardly from a container or other source of liquid under the desired static pressure. With the valve in the position shown in Figure 1 the valve port is partially open and the piston is at that point in its travel which is most remote from the discharge port 11, and about to descend. During the descent of the piston, the valve 20 moves further to the right and, when the valve port 21 is in full register with the cylinder port 11, it is also in full register with two discharge conduits 24 and 25, respectively, formed in valve supporting block 26, ports 24 and 25 downwardly diverging and terminating in a common horizontal plane just above a conveyor upon which are supported a series of containers, one of which is indicated at C³ in Figures 1 and 3 respectively.

The conveyor comprises the container supporting rail 27 and container advancing members 28 and 29 which, in this instance, are parallel chains provided with container engaging and pushing elements 28' and 29', respectively. The element 26 is secured in valve supporting position by leaf spring members 30 and 31 the terminal ends of which are curved as shown in Figures 2 and 3 and extend over and part way around the cylinder supporting rods 13. At its intermediate point each of the spring supports 30 and 31 is engaged by the head of an adjustable screw one of which is indicated at 33 and the other at 34, each of these screws being vertically disposed and having threaded engagement with an aperture in the underside of the valve supporting element 26 and each being provided with a lock nut, the lock nuts being indicated at 35 and 36, respectively. Screws 33 are so adjusted that the valve supporting element 26 will be resiliently urged upwardly by the supporting spring members 30 and 31, to hold the upper surface of the valve in close engagement at all times with the upper horizontal face 37 of a slideway formed in the enlarged lower end of the cylinder casting which is especially designed for the reception of the valve.

In the operation of the piston and valve it is desired that flow of liquid downwardly through port 11, valve port 21, and directional ports or ducts 24 and 25 be as rapid and yet as free of turbulence as possible. Means is therefore provided for actuating the piston and valve in timed relationship so that, when the piston is at the top of its stroke, the cylinder being full of liquid, and is about to initiate its downward movement, the valve opening will be relatively small, the position of the piston at this point being indicated at I in the diagram of Figure 4 and a corresponding valve opening being indicated at Ia. The piston actuating means is so designed that the piston rather slowly gets under way and is travelling most rapidly when it reaches its midpoint, or position IV in Figure 4, at which point the cylinder port 11 is fully open as indicated at IVa in this figure. The vertical distance between position I and position II in Figure 4 indicates the extent of piston travel during a certain interval of time, the distance between position II and position III, and likewise the distance between position III and position IV in this figure also indicating the extent of travel of the pistons during the succeeding and equal intervals of time. After the piston travels past its midpoint position IV its velocity of movement decreases, as indicated by the varying distances between the positions IV and V, the positions V and VI and the positions VI and VII, the same interval of time being required to advance the piston from any one of these positions to the next position. After passing the midpoint position IV, the valve serves to reduce the effective area of the cylinder discharge port 11 in a manner exactly the reverse of that in which it served to increase the effective area of this valve port during the initial movement of the piston, as indicated in Figure 4.

The mechanism for accomplishing this objective is of great simplicity. It includes a common horizontally disposed drive shaft 40 which may be rotated about a fixed axis at uniform velocity by any suitable driving means, for instance an electric motor. Fixed on the shaft 40 is a cylindrical cam 41 having a cam track 42 within which is a roller or cam follower 43. Cam follower 43 is rotatably supported upon a pin 44 projecting upwardly from the end of an arm 45 keyed or otherwise fixed upon a vertical shaft 46 rotatably supported in a vertical bearing formed in the laterally extending portion 14' of the side frame member 14. At its upper end shaft 46 has fixed thereon an arm 47 extending toward the valve 20, the free end of this arm being connected by means of a link 48 to a pin 49 set in the projecting portion 20' of the valve 20. The arrangement is such that, when the drive shaft 40 is rotated the slide valve 20 will be reciprocated to effect the charging and discharging of the cylinder.

The piston operating means includes a crank 50 the arms of which are fixed upon the adjacent ends of the interrupted drive shaft 40, as seen most clearly in Figure 2, this crank supporting the lower end of a pitman 51 extending substantially vertically upwardly. The pitman 51 is telescopic, comprising the rod-like lower portion 51a and the tubular or sleeve-like upper portion 51b, the upper end of rod 51a extending into a cylindrical axial recess formed in sleeve 51b, the upper end of rod 51a carrying a slide 52 which engages the cylindrical inner surface of the sleeve and passing through a cylindrical aperture in a nut 53, the pitman parts 51a and 51b being maintained in axial alignment by the engagement of the rod 51a with the nut 53 and the engagement of the annular slide 52 with the inner surface of sleeve 51b. Intermediate slide 52 and nut 53 is a helical compression spring 54 and intermediate slide 52 and the upper end of the cylindrical recess in the sleeve is a second helical compression spring 55. An extension 51c of the sleeve 51b carries a roller 56 which is adapted to strike, when the pitman descends, the upper end or head of a stop bolt 57 having threaded relation with the cylindrical inner wall of a split ferrule supported in a lateral extension 59 of a vertical bracket also mounted upon the supporting rods 13. The bolt 57 comprises a limiting stop for the sleeve-like upper end 51b of the pitman and determines the maximum extent of downward movement of this part.

The upper end 51b of the pitman is connected to the piston 18 by means which includes the rocking lever 61 and the link 62, lever 61 being pivotally mounted at an intermediate point upon a pin 63 which extends through an aperture in the link 60 and through two aligned apertures in the bifurcated upper end of the pedestal 60. It will be observed that there are three pairs of aligned apertures in the bifurcated upper end of the pedestal 60, which are indicated at 60a, 60b and 60c, and three corresponding apertures in the rocking lever 61, indicated at 61a, 61b and 61c, the construction described thus making possible the shifting of the fulcrum axis about which the lever 61 rocks as the pitman vertically reciprocates. The extent of sliding movement of the piston may thus be varied so that the quantity of the liquid to be delivered may be changed from time to time. Fine adjustments in piston travel are obtained by vertically adjusting the screw 57.

In the operation of the mechanism, the slide valve is first moved into a position such that the elongated duct 22 is in register with the cylinder port 11 and the supply duct 23. The piston is then in its lowermost position. The valve will remain in this position while the piston rises and the cylinder fills, mainly by reason of the pressure of liquid from below. After the filling operation has been completed, the valve will be first actuated to close the port 11 and to immediately thereafter slightly open it, the effective port opening being that indicated in position Ia of Figure 4 of the drawings. The piston then immediately begins its descent, increasing its speed of movement by reason of the action of the crank 50 until the piston reaches its midpoint, after which the crank action is such that the speed of piston movement decreases, the speed of rotation of the crank, of course, being uniform, but the action being such that its effective lever arm varies from instant to instant as it rotates in well known manner. The effective opening of the discharge port 11 is, therefore, varied from instant to instant as the speed of descent of the piston 18 in its cylinder varies from instant to instant during its travel. The arrangement is such that the milk will flow to the container with the least amount of turbulence. With a charging mechanism so constructed foaming of a liquid such as milk is decreased to a minimum and the speed of actuation of an automatic mechanism which includes the charging mechanism is not checked by reason of the foaming tendency of the liquid being handled.

Having thus described the invention, what is claimed as new and desired to be secured by Letters Patent is:

1. A liquid dispensing apparatus for delivering a precisely measured quantity of liquid such as milk, comprising in combination, a measuring chamber having a discharge port formed in the wall thereof, a valve mounted for sliding movement across the port for controlling the rate of discharge of fluid from the measuring chamber, a piston within and slidably engaging the wall of said chamber, said piston being movable toward and away from said port and being so formed as to expel the entire contents of the chamber on its discharging stroke, and means for producing synchronized movements of the piston and valve during the discharging of said chamber, said means effecting movement of the piston at an increasing rate of speed from the beginning of its stroke until it reaches the midpoint of its travel, and thereafter at a decreasing rate of speed, and the port being initially opened part way by the valve prior to the initiation of the discharging stroke of the piston, and thereafter fully opened, the valve reaching fully open position at about the time that the piston is travelling at its highest velocity.

2. A liquid dispensing apparatus for delivering a precisely measured quantity of liquid such as milk, comprising in combination, a measuring chamber having a discharge port formed in the wall thereof, a valve mounted for sliding movement across the port for controlling the rate of discharge of fluid from the measuring chamber, a piston within and slidably engaging the wall of said chamber, said piston being movable toward and away from said port and being so formed as to expel the entire contents of the chamber on its discharging stroke, and means for producing synchronized movements of the piston and valve during the discharging of said chamber, and thereafter moving toward closed position, reacting such position after the completion of the discharging stroke of the piston.

3. A liquid dispensing apparatus for delivering a precisely measured quantity of liquid such as milk, comprising in combination, a measuring chamber having a discharge port formed in the wall thereof, a valve mounted for sliding movement across the port for controlling the rate of discharge of fluid from the measuring chamber, a piston within and slidably engaging the wall of said chamber, said piston being movable toward and away from said port and being so formed as to expel the entire contents of the chamber on its discharging stroke, and means for producing synchronized movements of the piston and valve during the discharging of said chamber, the valve opening increasing as the piston speed increases and decreasing as the piston speed decreases.

4. A liquid dispensing apparatus for delivering a precisely measured quantity of liquid such as milk, comprising in combination, a measuring chamber having a discharge port formed in the wall thereof, a valve mounted for sliding movement across the port for controlling the rate of discharge of fluid from the measuring chamber, a piston within and slidably engaging the wall of said chamber, said piston being movable toward and away from said port and being so formed as to expel the entire contents of the chamber on its discharging stroke, and means for producing synchronized movements of the piston and valve during the discharging of said chamber, the valve opening being roughly proportional to the rate of delivery of the fluid from the chamber.

5. A liquid dispensing apparatus for delivering a precisely measured quantity of liquid such as milk, comprising in combination, a measuring chamber having a discharge port formed in the wall thereof, a valve mounted for sliding movement across the port for controlling the rate of discharge of fluid from the measuring chamber, a piston within and slidably engaging the wall of said chamber, said piston being movable toward and away from said port and being so formed as to expel the entire contents of the chamber on its discharging stroke, and means for producing synchronized movements of the piston and valve during the discharging of said chamber, the piston being operated by a crank so as to move on its discharging stroke first at an increasing velocity and thereafter at a decreasing velocity, and the valve opening increasing in area as the piston speed increases and decreasing in area as the piston speed decreases.

CHARLES Z. MONROE.